(12) United States Patent
Kumar et al.

(10) Patent No.: US 10,919,924 B2
(45) Date of Patent: Feb. 16, 2021

(54) TREATMENT OF ANTIMONY BEARING RESIDUES FOR PRODUCTION OF POTASSIUM ANTIMONY TARTRATE

(71) Applicant: Hindustan Zinc Limited, Udaipur (IN)

(72) Inventors: Ashish Kumar, Udaipur (IN); Sheeba Mashruwala, Udaipur (IN); Sundar Saran Sombhatla, Udaipur (IN); Kiran Kumar Rokkam, Udaipur (IN); Krishna Deo Sharma, Udaipur (IN)

(73) Assignee: Hindustan Zinc Limited, Rajasthan (IN)

( * ) Notice: Subject to any disclaimer, the term of this patent is extended or adjusted under 35 U.S.C. 154(b) by 0 days.

(21) Appl. No.: 15/405,187

(22) Filed: Jan. 12, 2017

(65) Prior Publication Data

US 2017/0197999 A1    Jul. 13, 2017

(30) Foreign Application Priority Data

Jan. 12, 2016   (IN) .............................. 201611001120

(51) Int. Cl.
| | |
|---|---|
| *C07F 9/90* | (2006.01) |
| *C22B 7/00* | (2006.01) |
| *C22B 30/02* | (2006.01) |
| *C22B 3/08* | (2006.01) |
| *C22B 3/22* | (2006.01) |

(52) U.S. Cl.
CPC ................... *C07F 9/90* (2013.01); *C22B 3/08* (2013.01); *C22B 3/22* (2013.01); *C22B 7/007* (2013.01); *C22B 30/02* (2013.01); *C07B 2200/13* (2013.01); *Y02P 10/20* (2015.11)

(58) Field of Classification Search
CPC ... C07F 9/90; C22B 3/08; C22B 7/007; C22B 3/22

See application file for complete search history.

(56) References Cited

U.S. PATENT DOCUMENTS 8,545,690 B1 * 10/2013 Wang ........................ C22B 3/46
205/604

OTHER PUBLICATIONS

Singh (Hydrometallurgy, 25, 19-25, 1990).*

* cited by examiner

*Primary Examiner* — Pancham Bakshi
(74) *Attorney, Agent, or Firm* — Kolisch Hartwell, P.C.

(57) ABSTRACT

A method for production of potassium antimony tartrate by utilizing one or more residues bearing antimony includes the step of leaching of the one or more residues bearing antimony for a first pre-determined time interval in each of one or more jacketed reactors. In addition, the method includes filtering obtained slurry from a leached solution of the one or more residues products bearing antimony to obtain an aqueous solution and a solid residue. The method also includes crystallizing the obtained aqueous solution to form one or more crystals of the potassium antimony tartrate in a jacketed crystallizer. The antimony contained in the one or more residues is in an oxidic form and the oxidic form of the antimony is more than 20%. The solid residue is a leached cake.

7 Claims, 8 Drawing Sheets

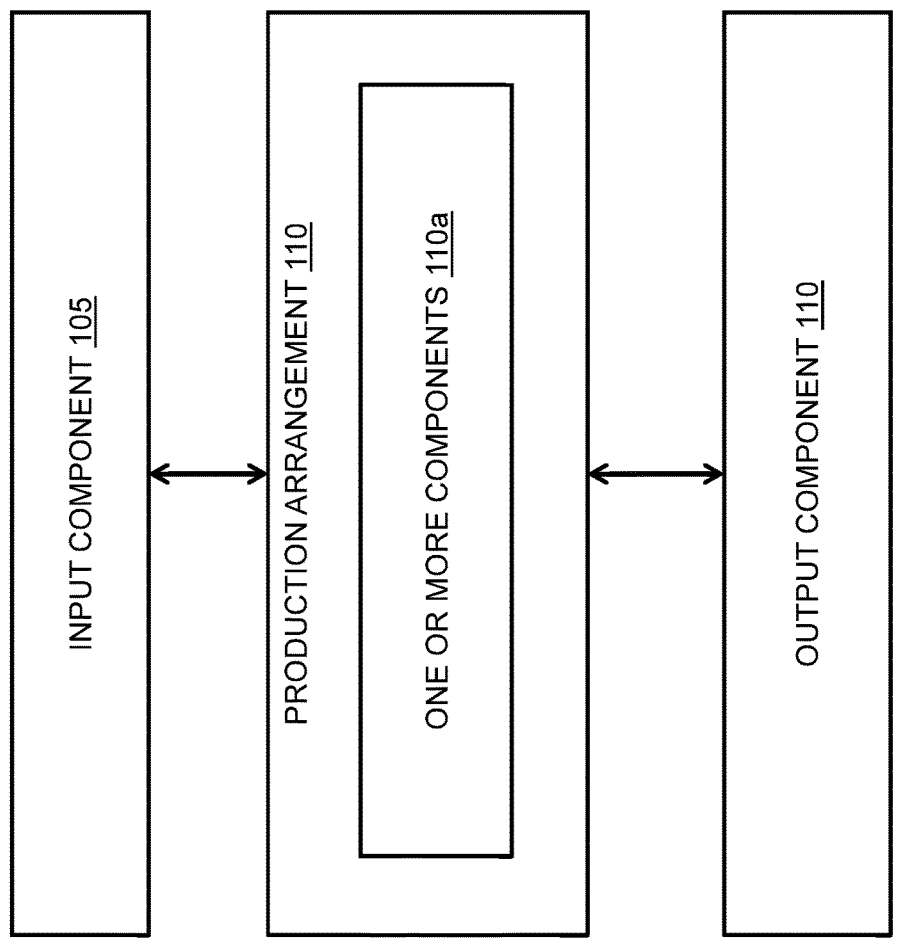

TREATMENT OF ANTIMONY BEARING RESIDUES FOR PRODUCTION OF POTASSIUM ANTIMONY TARTRATE

TECHNICAL FIELD

The present disclosure relates to the field of hydrometallurgy. More specifically, the present disclosure relates to production of potassium antimony tartrate by treatment of waste products with antimony.

BACKGROUND

Over the last few years, there has been an enormous increase in demand for production of metals in large quantity. One such metal which is in high demand and crucial for various industrial applications is zinc. Typically, the production of zinc is performed through pyro metallurgical route and hydrometallurgical route. However, due to high cost of production through pyro metallurgical route, a large number of industries are employed in carrying out hydrometallurgy of zinc. Potassium antimony tartrate is one of the most important and costly chemical/reagent used in the hydrometallurgy process of zinc for impurities removal. Typically, various industries employed in the hydrometallurgy of zinc procure potassium antimony tartrate from various vendors rather than producing potassium antimony tartrate.

The production of potassium antimony tartrate is carried out by utilizing antimony trioxide produced from antimony metal. Moreover, the antimony metal may be obtained from one or more sources for the production of potassium antimony tartrate. However, there are various other sources which are being neglected or ignored by various industries which could be utilized in the production of potassium antimony tartrate. Examples of few of the one or more sources include refining of lead, refining of silver and the like. These sources generate a large amount of residue, slag or waste products which are enriched in antimony along with other impurities. However, the antimony contained in the waste products is sold at lower realization value to the secondary treatment plants or ancillary industries for metal recoveries.

Several present methods are known in the art for the production of potassium antimony tartrate. One such method allows the production of potassium antimony tartrate by dissolving a pre-defined amount of antimony trioxide with tartaric acid. However, this method involves higher cost of $Sb/Sb_2O_3$ and results in higher cost of production. Another such method allows the production of potassium antimony tartrate by refluxing a solution of potassium hydrogen tartrate and antimony trioxide for 15 minutes. The hot mixture is then filtered and crystals of Antimony potassium tartrate precipitate out as colorless crystals. However, the above mentioned method involves different process conditions with higher cost of production.

Moreover, in an example, U.S. Pat. No. 2,397,197 provides a method for the production of potassium antimony tartrate by utilizing activated carbon along with a solution of potassium bi tartrate containing calcium tartrate and some organic matter. Moreover, the activated carbon removes the unwanted organic matter. Afterwards, oxalic acid is added to precipitate the calcium present in the liquid solution and tartaric acid is formed. Further, a pre-determined amount of antimony trioxide ($Sb_2O_3$) is added to the liquid solution to obtain antimonyl tartaric acid. The resulting solution is heated with a pinch of potassium salt to obtain potassium antimony tartrate. However, the potassium antimony tartrate produced by this method is impure and difficult to consume in zinc hydrometallurgical process.

Also, U.S. Pat. No. 2,335,585 A shows a method is provided for production of potassium antimony tartrate by utilizing a predetermined amount of antimony metal and a solution of dilute nitric acid. In addition, an aqueous solution of potassium bi tartrate is added to the solution containing dilute nitric acid and the antimony metal. Further, the mixture is heated to its boiling point and refluxed for a pre-determined interval of time. After evaporation and subsequent cooling, crystals of potassium antimony tartrate are separated. However, the above stated method involves higher cost of Sb/Sb2O3 and results in higher cost of production.

Further, yet another method performs the production of the potassium antimony tartrate by performing leaching of antimony slag with HCl acid. Accordingly, the leaching is followed by hydrolysis of antimony leached solution which produces antimony-oxy-chloride. This cake is washed and then leached with Potassium bi tartrate to produce Potassium antimony tartrate. Also, this solution is evaporated and crystallized for obtaining PAT crystals. However, the above mentioned method results in high capital expenditures due to chloride based leaching process. The PAT crystals generated will have high chloride levels and unacceptable for further utilization. Also, the hydrolysis process results in very high effluent which is rich in chloride whose treatment is a concern which builds unnecessary effluent treatment cost.

Furthermore, yet another method is mentioned in the prior art which performs a synthesis of the potassium antimony tartrate from antimony dross of lead smelters. The method involves utilization of the antimony dross obtained from lead refining section for recovery of antimony oxide followed by the synthesis of the potassium antimony tartrate. In addition, the method includes leaching of the antimony dross with a hydrochloric acid solution. Accordingly, a filtrate obtained from the leaching is hydrolyzed with water. Further, an antimony oxide precipitate acquired after the leaching is made to react with a solution of potassium hydrogen tartrate to form the potassium antimony tartrate. Further, the method indicates a 70% recovery of antimony as potassium antimony tartrate.

The existing methods and systems for the production of potassium antimony tartrate are either costly or produce impure PAT. In addition, the existing methods and systems do not utilize one or more residues which contain antimony as a residue for producing potassium antimony tartrate. Furthermore, the use of antimony in its crude form or antimony trioxide increases the cost of production of potassium antimony tartrate.

In light of the above stated discussion, there is a need for a method and system that not only overcomes the above stated disadvantages but also generates quality material from different sources in simple steps and cost effective manners.

SUMMARY

In an aspect, the present disclosure provides a method for production of potassium antimony tartrate by utilization of one or more residues bearing antimony. The one or more residues are obtained from one or more sources. The method includes leaching of the one or more residues bearing antimony for a first pre-determined interval of time in each of one or more jacketed reactors. In addition, the method includes filtration of the obtained slurry of a leached solution of the one or more residues bearing antimony for obtaining an aqueous solution and a solid residue. Moreover, the method includes evaporation of the obtained aqueous solution in an evaporator. Further, the method includes crystallization of the obtained aqueous solution for forming one or more crystals of the potassium antimony tartrate in a jacketed crystallizer. Furthermore, the method includes centrifugation for separation of mother liquor from the formed one or more crystals of the potassium antimony tartrate. The leaching is performed for obtaining slurry. The antimony contained in the one or more residues is in an oxidic form. The oxidic form of the antimony is more than 20%. The solid residue is a leached cake. The evaporation is performed to achieve a desired concentration of antimony in the aqueous solution when the concentration of the antimony in the aqueous solution being low. The aqueous solution is in a super saturation level. The crystallization is performed by cooling the aqueous solution by circulation of chilled water through jacketed walls of the jacketed crystallizer to maintain temperature in a range of 10-40° C. In addition, the aqueous solution is agitated continuously in the jacketed crystallizer for formation of the one or more crystals of the potassium antimony tartrate. The mother liquor is transferred to each of the one or more jacketed reactors for performing the production of the potassium antimony tartrate and for washing.

In an embodiment of the present disclosure, the leaching includes addition of a first plurality of substances in each of the one or more jacketed reactors to form a first solution. In addition, the formed first solution is heated up to a pre-determined temperature of 50° C. to 90° C. Moreover, the leaching includes addition of a second plurality of substances in the first solution in each of the one or more jacketed reactors to form a second solution. Further, the leaching includes injecting a solution of hydrogen peroxide to the second solution in each of the one or more jacketed reactors through a corresponding plurality of pumps after a second pre-determined interval of time. Furthermore, the leaching includes obtaining the leached solution of the one or more residues bearing antimony after the first pre-determined interval of time at the pre-determined temperature. The heating is done indirectly to avoid solution charring. The first plurality of substances includes mother liquor, cake washings, de-mineralized water or steam condensate water and a sulfuric acid solution. The sulfuric acid solution is added for maintaining pH of the first solution in a pre-determined range. The second plurality of substances includes the one or more residues bearing antimony and potassium hydrogen tartrate. The addition of the second plurality of substances is done based on a pre-determined criterion. The addition of potassium hydrogen tartrate is done based on required leaching efficiency and content of antimony in the one or more residues bearing antimony. Moreover, quantity of potassium hydrogen tartrate is slightly higher than stoichiometric requirement. Further, potassium hydrogen tartrate has a purity of more than 99%. The solution of hydrogen peroxide is added for oxidation of the second solution.

In an embodiment of the present disclosure, the pre-determined criterion includes attaining a desired temperature between 50° C. and 90° C. for the addition of the second plurality of substances. The pre-determined range of pH maintained by the addition of the sulfuric acid is 2.0 to 5.5.

In an embodiment of the present disclosure, the method further includes directly transferring the aqueous solution to the jacketed crystallizer for crystallization when the concentration of the antimony in the aqueous solution is in a desirable concentration range.

In an embodiment of the present disclosure, the method further includes washing the formed one or more crystals of the potassium antimony tartrate with water. The washing is done to extract the mother liquor entrapped in each of the one or more crystals of the potassium antimony tartrate. The one or more crystals of the potassium antimony tartrate are dried and ground.

In an embodiment of the present disclosure, the method further performs washing of the solid residue obtained from the filtration of the slurry of the leached solution of the one or more residues bearing antimony along with the mother liquor. The washing is done by adding the de-mineralized water or steam condensate water. The mother liquor is obtained from the centrifugation. The washing is done to wash out soluble antimony from the solid residue. The washing is performed for half to three hours and the washing is performed at a temperature of 30° C. to 90° C.

In an embodiment of the present disclosure, the method further includes filtration of slurry retrieved after the washing of the solid residue based on antimony content in the slurry. In addition, a filtrate obtained after the filtering is transferred to each of the one or more jacketed reactors when the antimony content is low.

In another embodiment of the present disclosure, the filtrate is transferred to the jacketed crystallizer for the crystallization when the antimony content is high.

In an embodiment of the present disclosure, the first pre-determined interval of time for the leaching of the one or more residues bearing antimony is between two to eight hours and the second pre-determined interval of time is 0.5 to 4 hours.

In another aspect, the present disclosure provides a method for production of potassium antimony tartrate by utilization of one or more residues bearing antimony. The one or more residues are obtained from one or more sources. The method includes leaching of the one or more residues bearing antimony for a first pre-determined interval of time in each of one or more jacketed reactors. In addition, the method includes filtration of the obtained slurry of a leached solution of the one or more residues bearing antimony for obtaining an aqueous solution and a solid residue.

Moreover, the method includes evaporation of the obtained aqueous solution in an evaporator. Further, the method includes crystallization of the obtained aqueous solution for forming one or more crystals of the potassium antimony tartrate in a jacketed crystallizer. Furthermore, the method includes centrifugation for separation of mother liquor from the formed one or more crystals of the potassium antimony tartrate.

Also, the method includes washing the formed one or more crystals of the potassium antimony tartrate with water. The leaching is performed for obtaining slurry. The antimony contained in the one or more residues is in an oxidic form. The oxidic form of the antimony is more than 20%. The leaching includes addition of a first plurality of substances in each of the one or more jacketed reactors to form a first solution. In addition, the formed first solution is heated up to a pre-determined temperature of 50° C. to 90° C.

Moreover, the leaching includes addition of a second plurality of substances in the first solution in each of the one or more jacketed reactors to form a second solution. Further, the leaching includes injecting a solution of hydrogen peroxide to the second solution in each of the one or more jacketed reactors through a corresponding plurality of pumps after a second pre-determined interval of time.

Furthermore, the leaching includes obtaining the leached solution of the one or more residues bearing antimony after the first pre-determined interval of time at the pre-determined temperature. The heating is done indirectly to avoid solution charring. The first plurality of substances includes mother liquor, cake washings, de-mineralized water or steam condensate water and a sulfuric acid solution. The sulfuric acid solution is added for maintaining pH of the first solution in a pre-determined range. The second plurality of substances includes the one or more residues bearing antimony and potassium hydrogen tartrate. The solution of hydrogen peroxide is added for oxidation of the second solution. The solid residue is a leached cake. The evaporation is performed to achieve a desired concentration of antimony in the aqueous solution when the concentration of the antimony in the aqueous solution being low. The aqueous solution is in a super saturation level. The crystallization is performed by cooling the aqueous solution by circulation of chilled water through jacketed walls of the jacketed crystallizer to maintain temperature in a range of 10-40° C.

In addition, the aqueous solution is agitated continuously in the jacketed crystallizer for formation of the one or more crystals of the potassium antimony tartrate. The mother liquor is transferred to each of the one or more jacketed reactors for performing the production of the potassium antimony tartrate and for washing. The washing is done to extract the mother liquor entrapped in each of the one or more crystals of the potassium antimony tartrate. The one or more crystals of the potassium antimony tartrate are dried and ground.

In an embodiment of the present disclosure, the addition of the second plurality of substances is done based on a pre-determined criterion. The addition of potassium hydrogen tartrate is done based on required leaching efficiency and content of antimony in the one or more residues bearing antimony. Moreover, quantity of potassium hydrogen tartrate is slightly higher than stoichiometric requirement. Further, potassium hydrogen tartrate has a purity of more than 99%. The pre-determined criterion includes attaining a desired temperature between 50° C. and 90° C. for the addition of the second plurality of substances. The pre-determined range of pH maintained by the addition of the sulfuric acid is 2.0 to 5.5.

In an embodiment of the present disclosure, the method further includes directly transferring the aqueous solution to the jacketed crystallizer for crystallization when the concentration of the antimony in the aqueous solution is in a desirable concentration range.

In an embodiment of the present disclosure, the method further performs washing of the solid residue obtained from the filtration of the slurry of the leached solution of the one or more residues bearing antimony along with the mother liquor. The washing is done by adding the de-mineralized water or steam condensate water. The mother liquor is obtained from the centrifugation. The washing is done to wash out soluble antimony from the solid residue. The washing is performed for half to three hours and the washing is performed at a temperature of 30° C. to 90° C.

In an embodiment of the present disclosure, the method further includes filtration of slurry retrieved after the washing of the solid residue based on antimony content in the slurry. In addition, a filtrate obtained after the filtering is transferred to each of the one or more jacketed reactors when the antimony content is low.

In another embodiment of the present disclosure, the filtrate is transferred to the jacketed crystallizer for the crystallization when the antimony content is high.

In an embodiment of the present disclosure, the first pre-determined interval of time for the leaching of the one or more residues bearing antimony is between two to eight hours and the second pre-determined interval of time is 0.5 to 4 hours.

BRIEF DESCRIPTION OF THE FIGURES

Figure 3:
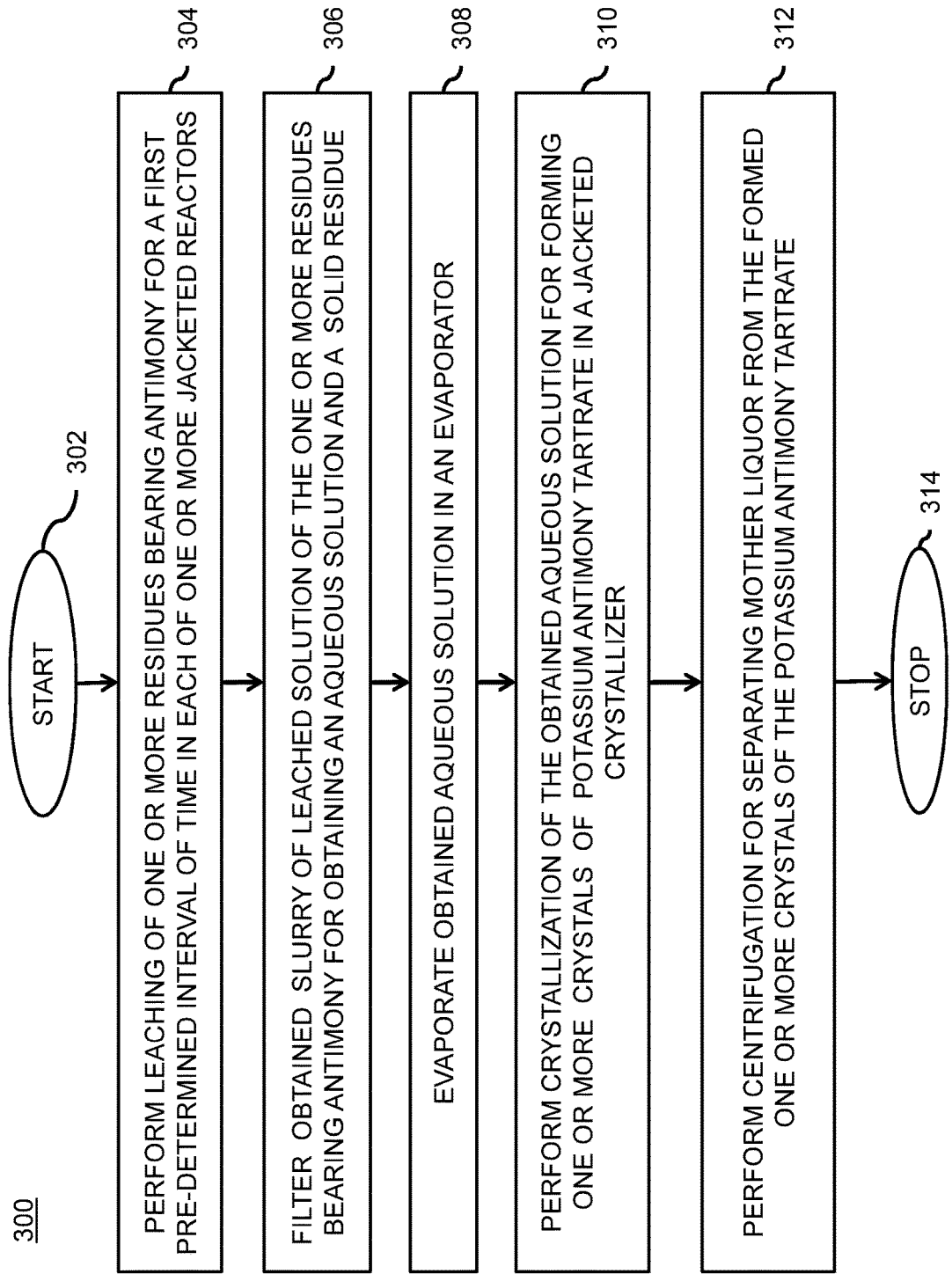
Figure 4:
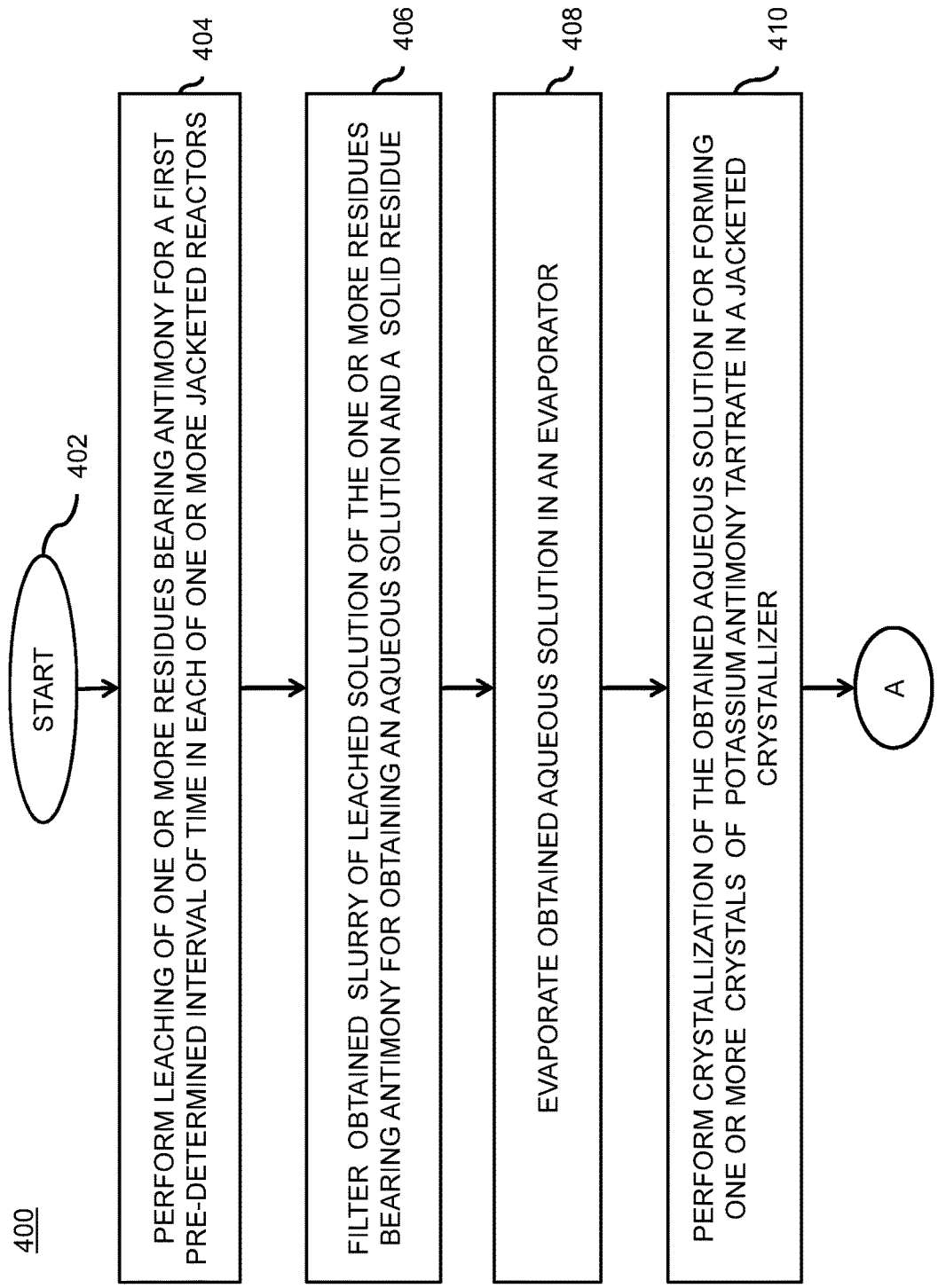
Figure 4:
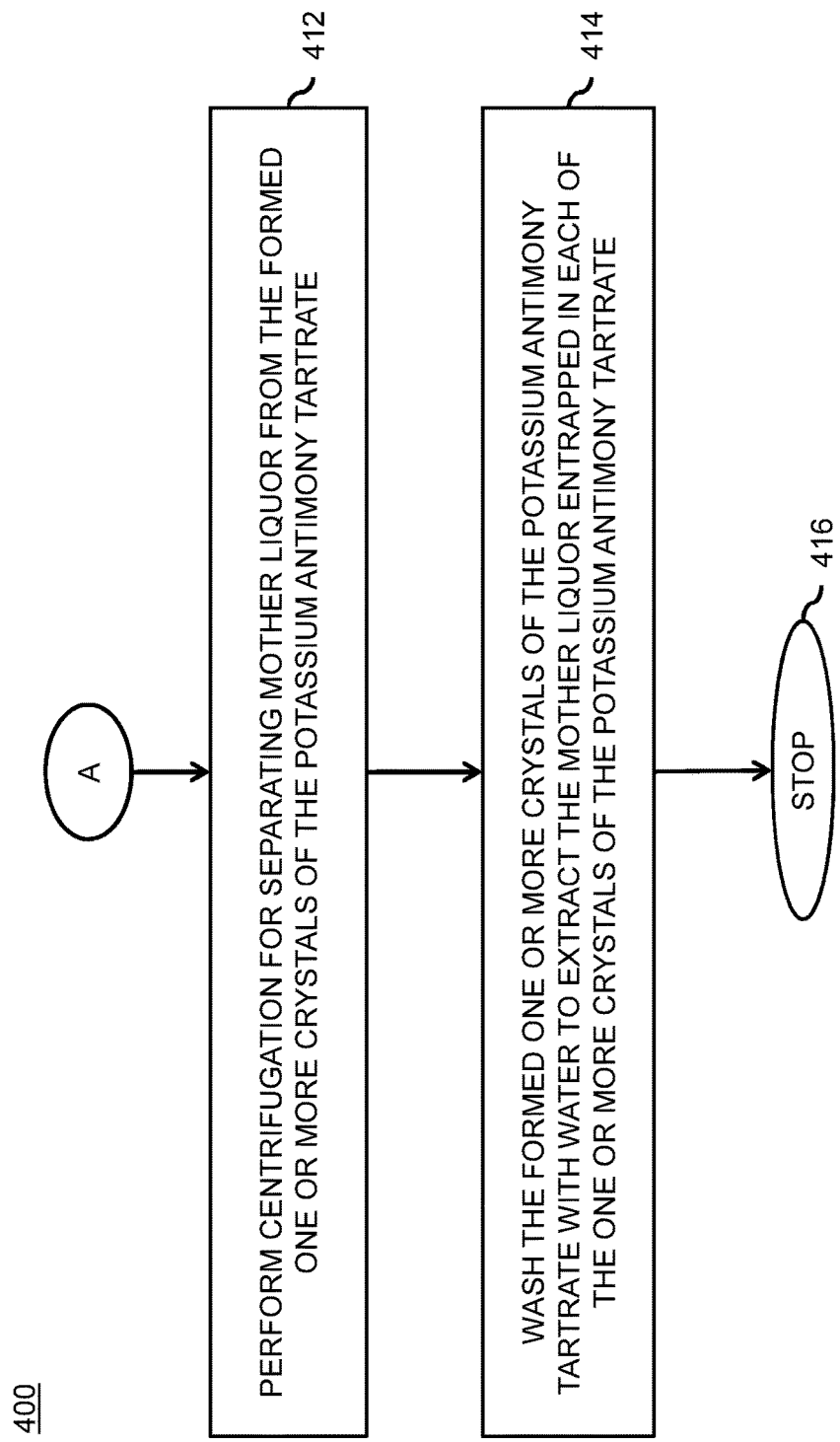

Having thus described the invention in general terms, reference will now be made to the accompanying drawings, which are not necessarily drawn to scale, and wherein:

FIG. 1 illustrates a general overview of a system for production of potassium antimony tartrate, in accordance with various embodiments of the present disclosure;

FIGS. 2A-2D illustrate a block diagram for the production of the potassium antimony tartrate, in accordance with various embodiments of the present disclosure;

FIG. 3 illustrates a flowchart for the production of the potassium antimony tartrate, in accordance with an embodiment of the present disclosure; and FIG. 4 illustrates another flowchart for the production of the potassium antimony tartrate, in accordance with another embodiment of the present disclosure.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a general overview of a system 100 for production of Potassium Antimony Tartrate by utilizing one or more residues bearing antimony, in accordance with various embodiments of the present disclosure. In an embodiment of the present disclosure, the system 100 is configured for the production of a plurality of potassium antimony tartrate crystals by utilizing the one or more residues bearing antimony. The one or more residues bearing antimony correspond to antimony bearing dusts, one or more by-products containing antimony, antimony bearing secondaries, waste products and the like. In an embodiment of the present disclosure, the one or more residues correspond to flue dust, pyrometallurgical dust, leached cake, slag and the like.

In addition, the one or more residues bearing antimony are obtained from one or more sources. Moreover, the one or more sources include processes involving refining of lead, processes involving refining of silver or any other processes having antimony as a waste product. In addition, the one or more sources include antimony as one of the waste products including dust, slag, cake or any form of secondary materials. The one or more residues bearing antimony correspond to one or more residues. The one or more residues have antimony as a waste product of the one or more residues produced during one or more chemical processes as dust, slag, cake or any form of secondary materials.

The system 100 includes an input component 105, a production arrangement 110 and an output component 115. The input component 105 stores one or more input materials required for the production of the potassium antimony tartrate. Moreover, the one or more input materials include the one or more residues bearing antimony, potassium hydrogen tartrate, cake washings, mother liquor, water or de-mineralized water or steam condensate water, sulfuric acid and hydrogen peroxide solution. Each of the one or more input materials are added in a pre-determined quantity based on requirement for production of a pre-determined amount of the potassium antimony tartrate. Moreover, the input component 105 corresponds to any type of unit for storing the one or more input materials. Further, the antimony contained in the one or more residues is in an oxidic form. In an embodiment of the present disclosure, the oxidic form of antimony is more than 20%.

In addition, the input component 105 is configured to provide the stored one or more input materials for the production of the potassium antimony tartrate. The input component 105 may be manually, mechanically or electrically operated. Moreover, the one or more input materials are in a mixed form. Each of the one or more input materials is stored separately inside the input component 105.

Going further, the input component 105 is associated with the production arrangement 110. In an embodiment of the present disclosure, the input component 105 is connected to the production arrangement 110 through a connecting medium. In another embodiment of the present disclosure, the input component 105 is mechanically connected to the production arrangement 110. In addition, the input component 105 is configured to provide or feed the one or more input materials to the production arrangement 110. The one or more input materials are fed through a passing medium. In an embodiment of the present disclosure, the one or more input materials are transferred through a raw material transfer pipe. In another embodiment of the present disclosure, the connection between the input component 105 and the production arrangement 110 is achieved through any type of connecting passage for enabling a smooth transfer of the one or more input materials from the input component 105 and the production arrangement 110. Further, the one or more input materials are fed in a pre-defined sequence (as described below in the detailed description of FIG. 2).

Going further, the production arrangement 110 is any type of unit configured for the production of the potassium antimony tartrate by utilizing the one or more input materials received from the input component 105. The production arrangement 110 performs one or more operations on the one or more input materials (as described later in the patent application). In addition, the production arrangement 110 includes one or more components 110a. In an embodiment of the present disclosure, the one or more components 110a perform the production of the potassium antimony tartrate. The one or more components 110a correspond to one or more devices for carrying out the production of the potassium antimony tartrate. Moreover, the production arrangement 110 follows a batch process for the production of the potassium antimony tartrate (as mentioned below in the patent application). Also, each of the one or more components 110a is configured to operate on a predefined temperature. Each of the one or more components 110a is configured to perform one or more processes. In an embodiment of the present disclosure, each of the one or more processes is performed for a pre-determined interval of time.

Further, the production arrangement 110 is configured to perform leaching of the one or more residues bearing antimony by performing a series of steps in a pre-defined sequential manner (as described below in the detailed description of FIG. 2). Furthermore, the production arrangement 110 is configured to perform filtering of a solution obtained from the leaching of the one or more residues bearing antimony (as mentioned below in the detailed description of FIG. 2). In addition, the production arrangement 110 is configured to perform crystallization of an output obtained after the filtering of the solution by performing a pre-defined series of steps (as described below in the detailed description of the FIG. 2). Moreover, the production arrangement 110 performs centrifugation on a final product obtained after the crystallization for separation of crystals (as mentioned below in the detailed description of the FIG. 2).

Further, the production arrangement 110 is associated with the output unit 115. In an embodiment of the present disclosure, the production arrangement 110 is connected to the output component 115 through any connecting medium. In another embodiment of the present disclosure, the production arrangement 110 is mechanically connected to the output component 115. In an embodiment of the present disclosure, the output component 115 is connected to a unit of the one or more components 110a associated with the production arrangement 110. In addition, the output component 115 is configured to collect a final output from the production arrangement 110 after the execution of the one or more processes by the one or more components 110a. The output component 115 collects the final output from the unit of the one or more components 110a of the production arrangement 110.

Moreover, the final product corresponds to the potassium antimony tartrate. The final product is in form of crystals of the potassium antimony tartrate. In addition, the output component 115 is configured to store the final product in a storage space of the output component 115. The output component 115 may be any type of unit or container having a pre-defined amount of space for the storage of the potassium antimony tartrate. Also, the output component 115 may be operated manually, mechanically or electrically for enabling the storage of the potassium antimony tartrate. In an embodiment of the present disclosure, the output component 115 stores the final product in any state including solid, liquid or gas. The final output from the production arrangement 110 is monitored for calculating a final efficiency based on a rate and quantity of the final output from the production arrangement 110.

It may be noted that in FIG. 1, the input component 105 is connected to the production arrangement 110; however those skilled in the art would appreciate that there are more number of input units connected to the production arrangement 110 for providing the one or more input materials. It may also be noted that in FIG. 1, the output component 115 is connected to the production arrangement 110 for collecting the final output, however those skilled in the art would appreciate that there are more number of output units connected to the production arrangement 110 for collecting the final output.

Figure 2A:
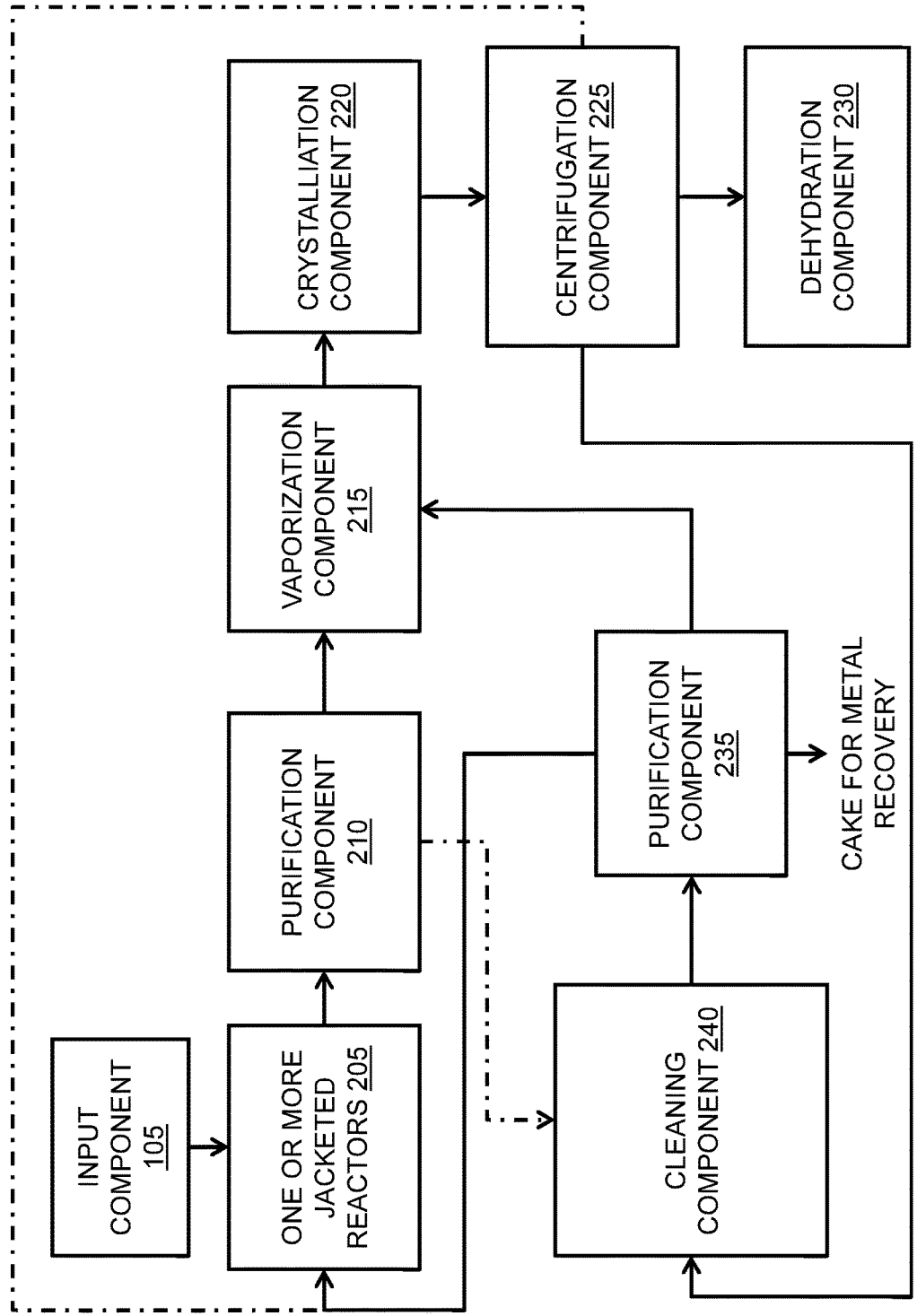

FIG. 2A illustrates a block diagram 200 for showing a plurality of units for the production of the potassium antimony tartrate, in accordance with various embodiments of the present disclosure. It may be noted that to explain the system elements of the FIG. 2, references will be made to the system elements of the FIG. 1. The plurality of units is configured to perform the production of the potassium antimony tartrate by utilizing the one or more input materials from the input component 105. In an embodiment of the present disclosure, the plurality of units corresponds to the one or more components 110a inside the production arrangement 110. Moreover, the one or more components 110a collectively perform the production of the potassium antimony tartrate crystals.

Going further, the block diagram 200 includes one or more jacketed reactors 205, a purification component 210, a vaporization component 215, a crystallization component 220, a centrifugation component 225, a dehydration component 230, a purification component 235 and a cleaning component 240. The above stated units/components correspond to the one or more components 110a which collectively perform the production of the crystals of the potassium antimony tartrate. Moreover, the one or more jacketed reactors 205 are a part of a leaching unit. Also, the leaching unit includes one or more pumps. Each pump of the one or more pumps is associated with a corresponding jacketed reactor of the one or more jacketed reactors 205.

Furthermore, each of the one or more jacketed reactors 205 is configured for performing leaching of the one or more residues bearing antimony for a first pre-determined interval of time. The leaching is performed for extracting one or more waste materials from the one or more input materials. Moreover, each of the one or more jacketed reactors 205 includes one or more jackets. Each of the one or more jackets is configured for regulating temperature of the one or more input materials. Each of the one or more jacketed reactors 205 includes an inlet valve for feeding the one or more input materials to each of the one or more jacketed reactors 205. The one or more jackets are filled with cool air, hot air, cool water, hot water, hot steam and the like.

Further, the pumping unit of the one or more pumping units attached to the corresponding jacketed reactor of the one or more jacketed reactors 205 corresponds to a dose pump and a control mechanism. The dose pump and the control mechanism regulate flow of one or more solutions to be added to each of the one or more jacketed reactors 205. Each pumping unit of the one or more pumping units is connected to the corresponding jacketed reactor of the one or more jacketed reactors 205. In an embodiment of the present disclosure, the connection is done through any type of connection medium. In an embodiment of the present disclosure, the connection is achieved through any mechanical medium. Moreover, each of the one or more pumping units is configured for pumping or supplying the one or more solutions to the corresponding one or more jacketed reactors 205.

In an embodiment of the present disclosure, the dose pump associated with each of the one or more pumping units is connected to the corresponding one or more jacketed reactors 205 at bottom. In an embodiment of the present disclosure, the dose pump associated with each of the one or more pumping units may be connected at any suitable place on the corresponding one or more jacketed reactors 205. Moreover, each of the one or more pumping units is a low volume pump.

Going further, the one or more input materials are provided to the one or more jacketed reactors 205 in stages and each stage is separated by pre-defined time intervals. Also, the leaching of the one or more residues bearing antimony is performed by adding a first plurality of substances in each of the one or more jacketed reactors to form a first solution. In an embodiment of the present disclosure, the first plurality of substances is added in each of the one or more jacketed reactors 205 at the same time. Moreover, the first plurality of substances includes mother liquor, cake washings, de-mineralized water or steam condensate water and a sulfuric acid solution. In an embodiment of the present disclosure, RO water or de-mineralized water or steam condensate water is added to obtain the potassium antimony tartrate with low chloride concentration. The chloride concentration depends on the water used for the leaching. In an embodiment of the present disclosure, the potassium antimony tartrate may be produced by adding normal water. In addition, the steam condensate water is added to maintain water volume balance. In an embodiment of the present disclosure, the reaction inside the one or more jacketed reactors 205 may be performed with live steam.

In addition, a pre-defined amount of the mother liquor, the cake washings and the de-mineralized water or the steam condensate water is added to each of the one or more jacketed reactors 205. The mother liquor corresponds to a liquid left after any crystallization process after crystals are separated. Also, a pre-defined volume and concentration of the sulfuric acid solution is added to the one or more jacketed reactors 205. Moreover, the sulfuric acid solution is added for maintaining pH of the first solution in a pre-determined range. In addition, the pre-determined range of pH maintained by the addition of the sulfuric acid is 2.0 to 5.5. Addition of the sulfuric acid shifts the pH in the range of 2.0 to 5.5. Accordingly, the first solution is continuously stirred. Each of the one or more jacketed reactors 205 currently contains the first solution at a particular temperature unfavorable for a reaction to take place inside each of the one or more jacketed reactors 205.

Further, the leaching process is continued by heating the formed first solution up to a pre-determined temperature of 50° C. to 90° C. The heating is done indirectly to avoid solution charring. In an embodiment of the present disclosure, the first solution inside each of the one or more jacketed reactors 205 is heated to a temperature that falls in the range of 50° C. to 90° C. The heating is done by utilizing any type of heating mechanism suitable for use in heating the first solution inside each of the one or more jacketed reactors 205.

Going further, the leaching process is continued by adding a second plurality of substances in the first solution in each of the one or more jacketed reactors 205 to form a second solution. Each of the second plurality of substances is added in each of the one or more jacketed reactors 205 containing the first solution. Moreover, the second plurality of substances includes the one or more residues bearing antimony and potassium hydrogen tartrate. Each of the second plurality of substances is added in a pre-determined quantity required for the production of potassium antimony tartrate. Also, addition of the second plurality of substances is done based on a pre-determined criterion. The addition of potassium hydrogen tartrate is done based on a leaching efficiency and content of antimony in the one or more residues bearing antimony. Moreover, quantity of potassium hydrogen tartrate is slightly higher than a stoichiometric requirement. Further, potassium hydrogen tartrate has a purity of more than 99%.

Further, the pre-determined criterion includes attaining a desired temperature between 50° C. and 90° C. for the addition of the second plurality of substances. In an embodiment of the present disclosure, the second plurality of substances is added when the temperature of the first solution is between a range of 50° C. and 90° C. In addition, a pre-defined quantity of the one or more residues bearing antimony and a pre-defined quantity of potassium hydrogen tartrate is added to each of the one or more jacketed reactors 205. Also, antimony contained in the one or more residues is in an oxidic form. The oxidic form of the antimony is more than 20%. Accordingly, the second solution is continuously stirred for a pre-defined interval of time. Moreover, the reaction of the first solution with the second plurality of substances occurs for half an hour at the desired temperature in each of the one or more jacketed reactors 205.

Further, the leaching process is continued by injecting a solution of hydrogen peroxide to the second solution in each of the one or more jacketed reactors 205 through the corresponding one or more pumps after a second pre-determined interval of time. In addition, the solution of hydrogen peroxide may be added for oxidation of the second solution. The solution of hydrogen peroxide ($H_2O_2$) acts as an oxidizing agent for the reaction taking place in each of the one or more jacketed reactors 205. Also, the solution of hydrogen peroxide is added slowly to the second solution for maximizing recovery of the potassium antimony tartrate.

Further, the solution of hydrogen peroxide is pumped at a pre-defined pressure. Furthermore, a pre-determined quantity of the solution of hydrogen peroxide is added to the second solution in each of the one or more jacketed reactors 205. Further, the leaching process is completed after obtaining a leached solution of the one or more residues bearing antimony after the first pre-determined interval of time at the pre-determined temperature. Furthermore, the leached solution is obtained in form of slurry. Also, the first pre-determined interval of time for the leaching of the one or more residues bearing antimony is between two to eight hours.

In an embodiment of the present disclosure, one or more reactions in the leaching process take place in each of the one or more jacketed reactors 205 for duration of two to eight hours. Accordingly, one or more contents inside each of the one or more jacketed reactors 205 are stirred or agitated continuously till completion of the reaction time. Moreover, the continuous agitation or stirring results in formation of the slurry. In an embodiment of the present disclosure, the slurry contains the potassium antimony tartrate mixed with other one or more impurities.

Further, the purification component 210 is connected to each of the one or more jacketed reactors 205. In an embodiment of the present disclosure, the purification component 210 is mechanically connected to each of the one or more jacketed reactors 205 through a connecting medium. Moreover, the slurry formed in each of the one or more jacketed reactors 205 is transferred to the purification component 210. In addition, the purification component 210 is any type of filter suitable for filtering the slurry formed from each of the one or more jacketed reactors 205. In an embodiment of the present disclosure, the filtering of the slurry is carried out in a filter press. Further, the filter press is a device containing a plurality of cloth filters connected in series for filtration and separation.

The filter press aims to separate a solid insoluble residue from a liquid solution. Moreover, the liquid solution contains the potassium antimony tartrate. In addition, the purification component 210 is configured for filtering the obtained slurry of the leached solution of the one or more residues bearing antimony for obtaining an aqueous solution and a solid residue. The solid residue is a leached cake. In addition, the slurry is added to a chamber of the purification component 210. Also, the slurry is added as soon as the reaction time inside the each of the one or more jacketed reactors 205 is complete. Moreover, the slurry is supplied to the purification component 210 at a pre-defined pressure.

Accordingly, the slurry is supplied through a feed pump. The filling time of the slurry inside the chamber of the purification component 210 depends on a flow of the feed pump. Moreover, the filtering is carried out by pressurizing the slurry from the press inside the purification component 210 for separating the aqueous solution and the solid insoluble residue. Accordingly, the slurry is collected on a cloth filter inside the purification component 210. Further, the filtering is carried out in a plurality of chambers inside the purification component 210.

Furthermore, each of the plurality of chambers is filled with the slurry and the aqueous solution is filtrated from the solid residue and passes through each of a plurality of cloth filters. Finally, the aqueous solution travels through drain ports and exits the purification component 210 through a discharge valve. Accordingly, the solid residue collected on each of the plurality of cloth filters is utilized for one or more purposes (as explained below in the patent application). The aqueous solution corresponds to a hot filtrate obtained from the filtering of the slurry inside the purification component 210.

Going further, the purification component 210 is connected to the vaporization component 215. In an embodiment of the present disclosure, the purification component 210 is mechanically connected to the vaporization component 215 through a connection medium. The vaporization component 215 includes corresponds to an evaporator. Further, the vaporization component 215 is configured for evaporating the obtained aqueous solution in the evaporator. The evaporating is done prior to the crystallization of the aqueous solution. Also, the evaporating is performed when concentration of the antimony in the aqueous solution is low.

Further, the vaporization component 215 is connected to the crystallization component 220. In an embodiment of the present disclosure, the vaporization component 215 is mechanically connected to the crystallization component 220. The connection is achieved through any type of connecting medium for enabling transfer of the evaporated aqueous solution from the vaporization component 215 to the crystallization component 220. Moreover, the aqueous solution is transferred to the crystallization component 220 at regular intervals of time. Also, the aqueous solution is transferred through a feed pipe connected to the crystallization component 220.

Moreover, the crystallization component 220 performs crystallization of the obtained aqueous solution for forming one or more crystals of the potassium antimony tartrate in a jacketed crystallizer. The crystallization component 220 generates the potassium antimony tartrate crystals by performing one or more operations. Also, the crystallization component 220 performs a liquid-solid separation for the formation of the one or more crystals of the potassium antimony tartrate. In addition, the crystallization component 220 includes a crystallization tank for the storage of the filtrate (the aqueous solution) and the jacketed crystallizer. Accordingly, the aqueous solution is collected in the jacketed crystallizer. In addition, the crystallization component 220 is provided with an open top for allowing faster dissipation of heat. The antimony content inside the aqueous solution is in a super saturation level. In an embodiment of the present disclosure, the antimony content inside the aqueous solution is 70-200 grams per litre.

Moreover, the crystallization is performed by cooling the aqueous solution by circulating chilled water through jacketed walls of the jacketed crystallizer to maintain temperature in a range of 10-40° C. Further, the crystallization process is continued by continuously agitating the aqueous solution in the jacketed crystallizer for forming the one or more crystals of the potassium antimony tartrate. Also, a retention time of 6 to 12 hours is provided for the crystallization of the potassium antimony tartrate. The continuous agitation helps in making fine crystals of the potassium antimony tartrate.

Moreover, the purification component 210 is connected to the cleaning component 240. In an embodiment of the present disclosure, the purification component 210 is connected to the cleaning component 240 through any type of connection allowing passage of the solid residue obtained from the purification component 210. In addition, the solid residue is obtained after performing the filtering of the slurry (as exemplary stated above in the patent application). In an example, the cleaning component 240 includes a wash reactor. Moreover, the cleaning component 240 is configured for washing the solid residue obtained from the filtering of the slurry of the leached solution along with the mother liquor obtained from the centrifugation. Further, the washing is performed by adding the de-mineralized water or steam condensate water. The washing is done to wash out soluble antimony from the solid residue.

Also, the washing is performed for two to four hours. The washing is performed at a temperature of 30° C. to 90° C. Further, the washing of the solid residue results in formation of slurry. The cleaning component 240 is connected to the purification component 235. Furthermore, the formed slurry is sent back to the purification component 235 for the filtering of the slurry. Moreover, the purification component 235 is configured for filtering the slurry retrieved after the washing of the solid residue after the washing of the solid residue based on antimony content in the slurry. In addition, a filtrate obtained after the filtering is transferred to each of the one or more jacketed reactors 205 when the antimony content is low. Moreover, the filtrate is transferred to the jacketed crystallizer for the crystallization when the antimony content is high. Also, the filtering results in separation of lead and silver rich cake with low antimony content. The lead and silver cake may be consumed for various purposes. For example, the silver and lead may be used in pyrosmelters as secondaries for recovery of lead and silver metals.

Going further, the crystallization component 220 is connected to the centrifugation component 225. In an embodiment of the present disclosure, the crystallization component 220 is mechanically connected to the centrifugation component 225. The one or more crystals of the potassium antimony tartrate are obtained with some amount of the mother liquor after the crystallization in the crystallization component 220. Further, the centrifugation component 225 performs centrifugation for separating the mother liquor from the formed one or more crystals of the potassium antimony tartrate. The mother liquor with the one or more crystals of the potassium antimony tartrate is subjected for the centrifugation through gravity or through pump. Further, the centrifugation is performed by washing the formed one or more crystals of the potassium antimony tartrate.

Moreover, the centrifugation component 225 includes one or more centrifuges. The purpose of the one or more centrifuges is to separate the one or more crystals of the potassium antimony tartrate from the mother liquor. Also, the one or more centrifuges work based on a sedimentation principle in which a centripetal acceleration causes denser substances and particles to move outward in the radial direction. Examples of the one or more centrifuges include but may not be limited to Horizontal model, Vertical model, Manual Top Discharge, Bottom Discharge. The one or more crystals of the potassium antimony tartrate are solid crystals and denser as compared to the mother liquor. Further, the one or more centrifuges accelerate and push the one or more crystals of the potassium antimony tartrate on walls of each of the one or more centrifuges. Accordingly, the one or more crystals of the potassium antimony tartrate crystals are collected.

Moreover, the mother liquor is discharged to the cleaning component 240 after performing the centrifugation inside the centrifugation component 225. The cleaning component 240 is connected with the centrifugation unit 230. Moreover, the cleaning component 240 stores the mother liquor. Further, the centrifugation component 225 pumps the mother liquor to each of the one or more jacketed reactors 205. The mother liquor is transferred back to each of the one or more jacketed reactors 205 for re-initiating the production of the potassium antimony tartrate. In an embodiment of the present disclosure, the mother liquor is used for production of next batch of the potassium antimony tartrate.

Moreover, the one or more crystals of the potassium antimony tartrate obtained from the centrifugation component 225 are washed. The washing is done inside the centrifugation component 225. Also, the washing is done for washing the formed one or more crystals of the potassium antimony tartrate for extracting the mother liquor entrapped in each of the one or more crystals of the potassium antimony tartrate. Accordingly, the one or more crystals of the potassium antimony tartrate obtained are pure crystals with purity above 98%.

Moreover, the centrifugation component 225 is connected to the dehydration component 230. The dehydration component 230 is configured for drying and grinding the one or more crystals of the potassium antimony tartrate. In an embodiment of the present disclosure, the one or more crystals of the potassium antimony tartrate obtained from the centrifugation are dried and grinded. The one or more crystals of the potassium antimony tartrate obtained from each of the one or more centrifuges are dried in one or more ovens at a suitable temperature. Moreover, the one or more crystals of the potassium antimony tartrate are pulverized and bagged as a final product in form of a powder. Moreover, the grinding is done in any type of grinding machine.

In an embodiment of the present disclosure, the present method for the production of the potassium antimony tartrate reduces the overall cost of production due to utilization of waste products bearing antimony. In an embodiment of the present disclosure, the present method for the production of the potassium antimony tartrate utilizes one or more waste materials and prevents dumping of waste materials. In an example, 1 liter of leachant is prepared by addition of sulphuric acid and potassium hydrogen tartrate in distilled water. In an embodiment of the present disclosure, the addition of potassium hydrogen tartrate is kept slightly higher than a stoichiometric requirement. Further, the leachant is heated up to 90° C. and 150 grams of dust bearing 60% antimony is added and retention time of 8 hours is provided. Accordingly, the slurry is filtered and filtrate is analyzed for antimony content. Moreover, the residue is washed, dried and grinded before analyzing. In addition, the antimony content of final filtrate is 59 gpl and the antimony content of the residue is 28%. In an embodiment of the present disclosure, potassium antimony tartrate crystal formation is not obtained as the antimony content in filtrate was lower than the saturated limit. Accordingly, the filtrate is evaporated with mild stirring to achieve 200 gpl antimony concentration. Going further, the filtrate is cooled at room temperature for 8 hours. Accordingly, the potassium antimony tartrate slurry is filtered and 110 grams of potassium antimony tartrate crystals of purity more than 99% and mother liquor of 80 gpl Antimony concentration is obtained. In another example, 1 liter of leachant is prepared with mother liquor having 80 gpl antimony concentration and potassium hydrogen tartrate in distilled water. Moreover, hydrogen peroxide is added based on a sulphidic content of antimony dust to enhance recovery of antimony. Further, the leachant is heated up to 90° C. and 150 grams of dust bearing 60% antimony is added and retention time of 8 hours is provided. Accordingly, the slurry is filtered and filtrate is analyzed for antimony content. Moreover, the residue is washed, dried and grinded before analyzing. In addition, the antimony content of final filtrate is 116 gpl and the antimony content of the residue is 22%. Accordingly, the filtrate is evaporated to prepare saturate solution of potassium antimony tartrate. Going further, the filtrate is cooled at 10° C. for 4 hours. Accordingly, the potassium antimony tartrate slurry is filtered and 247 grams of potassium antimony tartrate crystals of purity more than 99% is obtained.

In yet another example, a pilot plant testing is conducted in 1000 liter reactor. A leachant is prepared by addition of 650 liter mother liquor of 83 gpl antimony concentration, 180 Kg dust with 50% antimony content and potassium hydrogen tartrate in distilled water. Further, the leachant is heated up to 80° C. and retention time of 8 hours is provided. Accordingly, the slurry is filtered and filtrate is analyzed for antimony content. Moreover, the residue is washed, dried and grinded before analyzing. In addition, the antimony content of final filtrate is 120 gpl. Going further, the filtrate is cooled at room temperature (28° C.) for about 12 hours. Accordingly, the potassium antimony tartrate slurry is filtered and 115 Kilograms of potassium antimony tartrate crystals of purity more than 99% is obtained. In addition, 125 Kilograms of residue consisting of 24% antimony is generated and washed to generate a filtrate with low antimony content.

It may be noted that in FIG. 2A, the vaporization component 215 is attached with the purification component 210 and the purification component 235; however, those skilled in the art would appreciate that there are more number of filtration units attached with more number of evaporation units. It may also be noted that in FIG. 2A, the crystallization component 220 is connected with the centrifugation component 225; however, those skilled in the art would appreciate that more number of crystallization units are connected with more number of centrifugation units. Also, it may be noted that in FIG. 2A, the cleaning component 240 is attached to the centrifugation component 225; however, those skilled in the art would appreciate that there are more number of washing units attached with more number of centrifugation units.

Figure 2B:
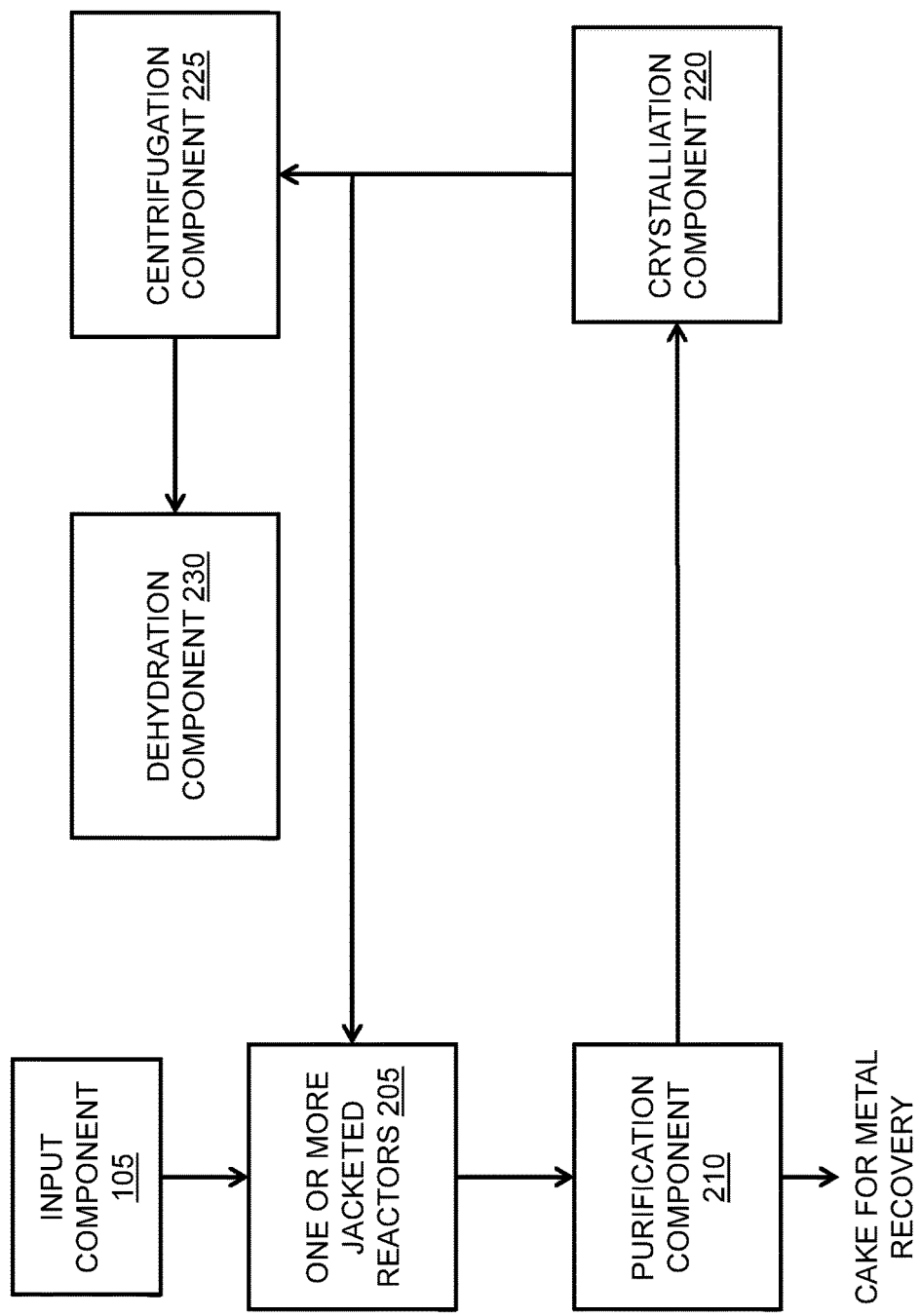

In another embodiment of the present disclosure, as illustrated in FIG. 2B, the production of the potassium antimony tartrate is performed by utilizing the one or more jacketed reactors 205, the purification component 210, the crystallization component 220, the centrifugation component 225 and the dehydration component 230. Moreover, the aqueous solution obtained from the purification component 210 is directly sent for the crystallization to the crystallization component 220. The purification component 210 is configured for directly transferring the aqueous solution to the jacketed crystallizer for the crystallization when the concentration of the antimony in the aqueous solution is in a desirable concentration.

Further, the crystallization component 220 performs the crystallization to form the one or more crystals of the potassium antimony tartrate (as stated above in the detailed description of FIG. 2A). Furthermore, the centrifugation component 225 performs the centrifugation of the one or more crystals obtained from the crystallization component 220 for separating the mother liquor from the one or more crystals. Accordingly, the mother liquor is transferred to each of the one or more jacketed reactors 205 to be utilized as an input for the production of the potassium antimony tartrate.

Also, the one or more crystals of the potassium antimony tartrate are subjected to the drying and the grinding in the dehydration component 230 to obtain the one or more crystals in the powdered form. In addition, the washing is carried out in the centrifugation component 225 only.

Figure 2C:
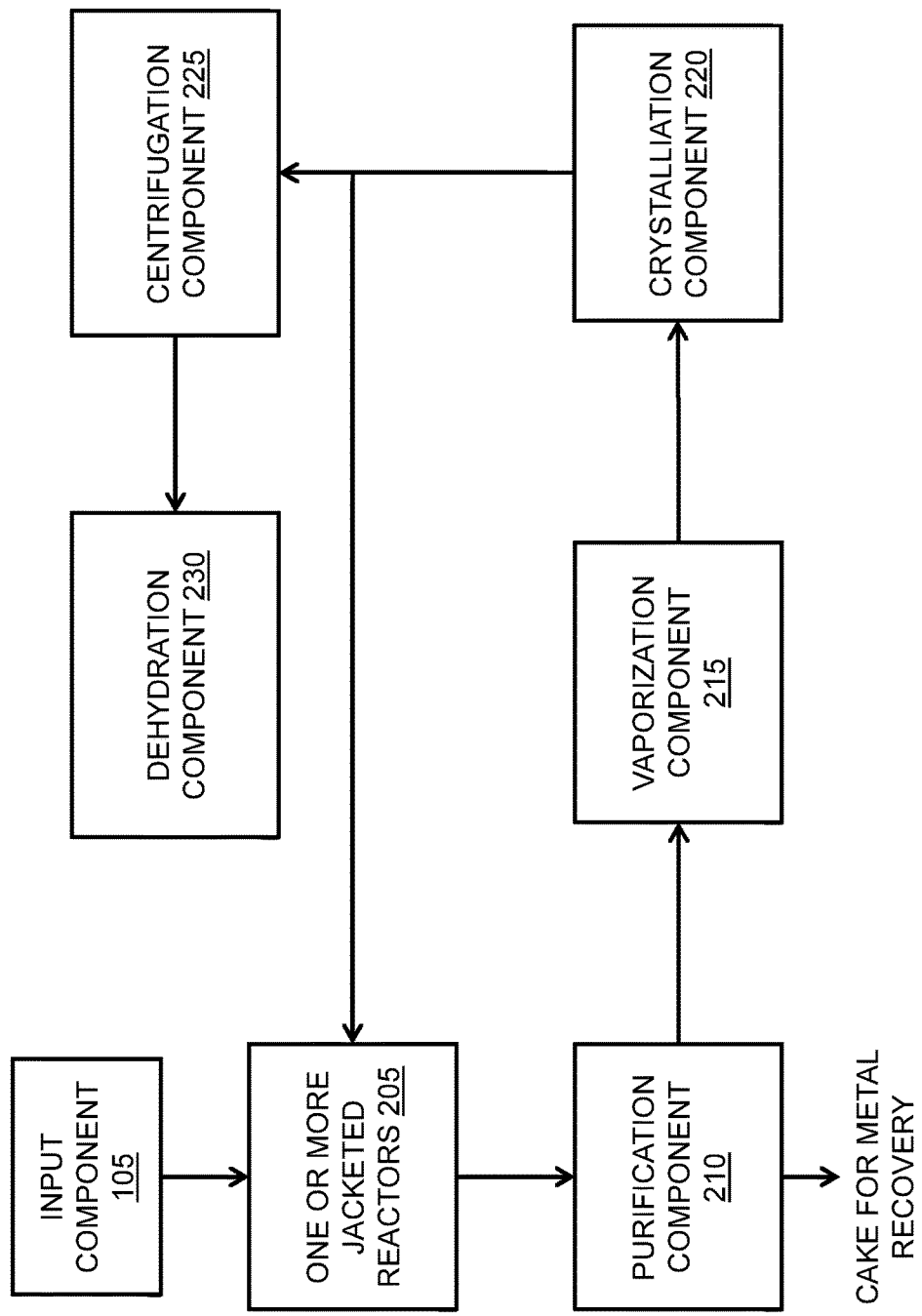

In an embodiment of the present disclosure, as illustrated in FIG. 2C, the production of the potassium antimony tartrate is performed by utilizing the one or more jacketed reactors 205, the purification component 210 and the vaporization component 215. In addition, the production of the potassium antimony tartrate is performed by utilizing the crystallization component 220, the centrifugation component 225 and the dehydration component 230. Moreover, the one or more jacketed reactors 205 perform the leaching of the one or more residues bearing the antimony and supply the slurry obtained from the leaching to the purification component 210.

Accordingly, the purification component 210 performs the filtering of the slurry to provide the filtrate in the form of the aqueous solution to the vaporization component 215. The filtrate is transferred to the vaporization component 215 when the antimony content in the aqueous solution is low. Accordingly, the vaporization component 215 evaporates the obtained aqueous solution and transfers it to the crystallization component 220 for performing the crystallization of the evaporated aqueous solution. The crystallization component 220 provides the one or more crystals of the potassium antimony tartrate. Moreover, the washing is performed in the crystallization component 220.

Accordingly, the one or more crystals of the potassium antimony tartrate are subjected to centrifugation in the centrifugation component 225 for removing the entrapped mother liquor from the one or more crystals of the potassium antimony tartrate. The one or more crystals of the potassium antimony tartrate are sent to the dehydration component 230 for the drying and grinding for obtained the one or more crystals in the powdered form. The centrifugation component 225 transfers the mother liquor obtained from the centrifugation to each of the one or more jacketed reactors 205 for continuing the production of the potassium antimony tartrate.

Figure 2D:
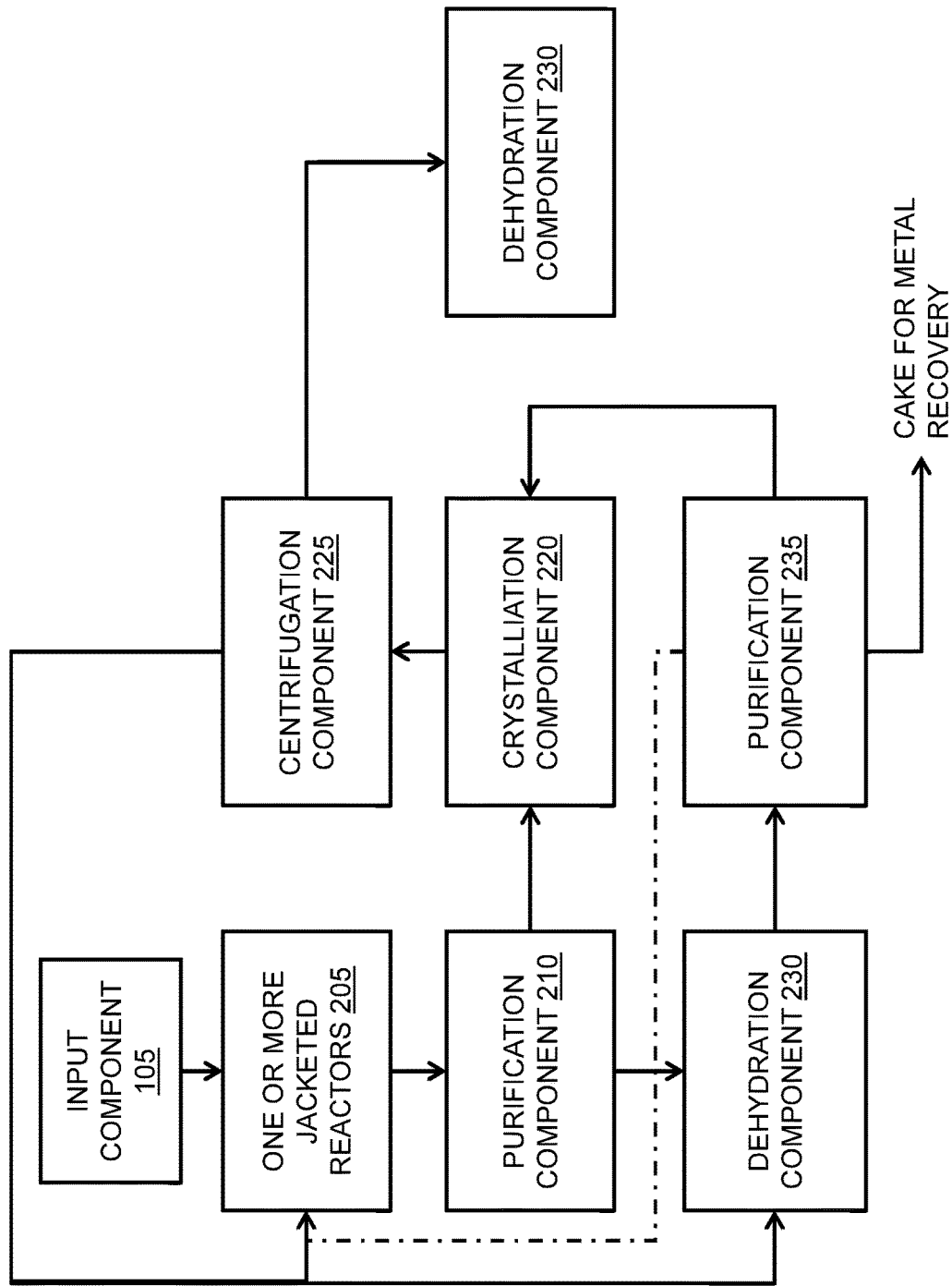

In yet another embodiment of the present disclosure, as illustrated in FIG. 2D, the production of the potassium antimony tartrate is carried out by utilizing the one or more jacketed reactors 205, the purification component 210, the crystallization component 220, the centrifugation component 225, the dehydration component 230, the purification component 235 and the cleaning component 240. Going further, the one or more jacketed reactors 205 perform the leaching of the one or more residues bearing the antimony and supply the slurry obtained from the leaching to the purification component 210 (as elaborated in the detailed description of the FIG. 2A).

Accordingly, the purification component 210 performs the filtering of the slurry to provide the filtrate in the form of the aqueous solution to the crystallization component 220. Moreover, the aqueous solution obtained from the purification component 210 is directly sent for the crystallization to the crystallization component 220. The purification component 210 is configured for directly transferring the aqueous solution to the jacketed crystallizer for the crystallization when the concentration of the antimony in the aqueous solution is in the desirable concentration (as explained above in the detailed description of the FIG. 2B).

Further, the crystallization component 220 performs the crystallization to form the one or more crystals of the potassium antimony tartrate (as stated above in the detailed description of the FIG. 2A). Furthermore, the centrifugation component 225 performs the centrifugation of the one or more crystals obtained from the crystallization component 220 for separating the mother liquor from the one or more crystals. Accordingly, the mother liquor is transferred to each of the one or more jacketed reactors 205 to be utilized as the input for the production of the potassium antimony tartrate (as previously described in the detailed description of the FIG. 2A).

Further, the centrifugation component 225 transfers the mother liquor to the cleaning component 240. Also, the purification component 210 transfers the solid residue to the cleaning component 240. Accordingly, the cleaning component 240 washes the solid residue along with the mother liquor. Accordingly, the cleaning component 240 supplies the slurry obtained from the washing to the purification component 235. The purification component 235 filters the slurry and transfers the filtrate to the crystallization component 220 for the crystallization when the antimony content is high (as described above in the detailed description of the FIG. 2A). Also, the one or more crystals of the potassium antimony tartrate are subjected to the drying and the grinding in the dehydration component 230 to obtain the one or more crystals in the powdered form.

FIG. 3 illustrates a flowchart 300 for the production of potassium antimony tartrate by utilizing the one or more residues bearing antimony, in accordance with an embodiment of the present disclosure. The flowchart 300 initiates at step 302. Following step 302, at step 304, the leaching of the one or more residues bearing antimony for the first pre-determined interval of time in the one or more jacketed reactors 205 is performed. The leaching is performed by adding the first plurality of substances in each of the one or more jacketed reactors 205 to form the first solution. In addition, the leaching is performed by heating the formed first solution up to the pre-determined temperature of 50° C. to 90° C. Accordingly, the leaching is performed by adding the second plurality of substances in the first solution in each of the one or more jacketed reactors 205 to form the second solution. The solution of hydrogen peroxide is injected to the second solution in each of the one or more jacketed reactors 205 through the corresponding one or more pumps after the second pre-determined interval of time. The first plurality of substances includes the mother liquor, the cake washings, the de-mineralized water or steam condensate water and the sulfuric acid solution. Moreover, the second plurality of substances includes the one or more residues bearing antimony and potassium hydrogen tartrate. The leached solution of the one or more residues bearing antimony is obtained in the form of slurry.

At step 306, the vaporization component 215 evaporates the obtained aqueous solution. The evaporation is performed to achieve a desired concentration of antimony in the aqueous solution when the concentration of the antimony in the aqueous solution being low. At step 308, the purification component 210 filters the obtained slurry of the leached solution of the one or more residues bearing antimony to obtain the aqueous solution and the solid residue. At step 310, the crystallization component 220 performs the crystallization of the obtained aqueous solution to form the one or more crystals of the potassium antimony tartrate. The crystallization is performed by cooling the aqueous solution by circulating the chilled water through the jacketed walls of the jacketed crystallizer to maintain the temperature in the range of 10-40° C. Further, the crystallization is performed by continuously agitating the aqueous solution in the jacketed crystallizer to generate the one or more crystals of the potassium antimony tartrate. At step 312, the centrifugation component 225 performs centrifugation for separation of the mother liquor from the formed one or more crystals of the potassium antimony tartrate. The mother liquor is transferred to each of the one or more jacketed reactors for performing the production of the potassium antimony tartrate and for washing. The flowchart 300 terminates at step 314.

FIG. 4 illustrates another flowchart 400 for the production of potassium antimony tartrate by utilizing the one or more residues bearing antimony, in accordance with another embodiment of the present disclosure. The flowchart 400 initiates at step 402. Following step 402, at step 404, the leaching of the one or more residues bearing antimony for the first pre-determined interval of time in the one or more jacketed reactors 205 is performed. The leaching is performed by adding the first plurality of substances in each of the one or more jacketed reactors 205 to form the first solution. In addition, the leaching is performed by heating the formed first solution up to the pre-determined temperature of 50° C. to 90° C. Accordingly, the leaching is performed by adding the second plurality of substances in the first solution in each of the one or more jacketed reactors 205 to form the second solution. The solution of hydrogen peroxide is injected to the second solution in each of the one or more jacketed reactors 205 through the corresponding one or more pumps after the second pre-determined interval of time. The first plurality of substances includes the mother liquor, the cake washings, the de-mineralized water or steam condensate water and the sulfuric acid solution. Moreover, the second plurality of substances includes the one or more residues bearing antimony and potassium hydrogen tartrate. The leached solution of the one or more residues bearing antimony is obtained in the form of slurry.

At step 406, the vaporization component 215 evaporates the obtained aqueous solution. The evaporation is performed to achieve a desired concentration of antimony in the aqueous solution when the concentration of the antimony in the aqueous solution being low. At step 408, the purification component 210 filters the obtained slurry of the leached solution of the one or more residues bearing antimony to obtain the aqueous solution and the solid residue. At step 410, the crystallization component 220 performs the crystallization of the obtained aqueous solution to form the one or more crystals of the potassium antimony tartrate. The crystallization is performed by cooling the aqueous solution by circulating the chilled water through the jacketed walls of the jacketed crystallizer to maintain the temperature in the range of 10-40° C. Further, the crystallization is performed by continuously agitating the aqueous solution in the jacketed crystallizer to generate the one or more crystals of the potassium antimony tartrate. At step 412, the centrifugation component 225 performs centrifugation for separation of the mother liquor from the formed one or more crystals of the potassium antimony tartrate. The mother liquor is transferred to each of the one or more jacketed reactors for performing the production of the potassium antimony tartrate and for washing. At step 414, the cleaning component 240 washes the formed one or more crystals of the potassium antimony tartrate with water. The washing is done to extract the mother liquor entrapped in each of the one or more crystals of the potassium antimony tartrate. The one or more crystals of the potassium antimony tartrate are dried and ground. The flowchart 400 terminates at step 416.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A method for production of potassium antimony tartrate by utilizing one or more residues bearing antimony, the one or more residues being obtained from one or more sources, the method comprising:

performing leaching of the one or more residues bearing antimony in each of one or more jacketed reactors, wherein the leaching being performed for obtaining a slurry, wherein the leaching process being performed for a first pre-determined interval of time, wherein the leaching being done by performing a set of steps, wherein the slurry is obtained after the first pre-determined interval of time, wherein the antimony contained in the one or more residues being in an oxidic form and wherein the oxidic form of the antimony being more than 20%;

filtering the obtained slurry of a leached solution of the one or more residues bearing antimony for obtaining an aqueous solution and a solid residue; wherein the solid residue being a leached cake;

evaporating the obtained aqueous solution in an evaporator, wherein the evaporating is performed to achieve a super-saturation concentration of antimony in the aqueous solution;

performing crystallization of the obtained aqueous solution for forming one or more crystals of the potassium antimony tartrate in a jacketed crystallizer, wherein the aqueous solution being in a super saturation level and wherein the crystallization being performed by:
  cooling the aqueous solution by circulating chilled water through jacketed walls of the jacketed crystallizer to maintain temperature in a range of 10-40° C.;
  continuously agitating the aqueous solution in the jacketed crystallizer for forming the one or more crystals of the potassium antimony tartrate;

performing centrifugation for separating mother liquor from the formed one or more crystals of the potassium antimony tartrate, wherein the mother liquor being transferred to each of the one or more jacketed reactors for performing the production of the potassium antimony tartrate and for washing; wherein the set of steps for performing the leaching comprises:
  adding a first plurality of substances in each of the one or more jacketed reactors to form a first solution, wherein the first plurality of substances comprises the mother liquor, cake washings, demineralized water or steam condensate water, and a sulfuric acid solution, and wherein the sulfuric acid solution is added to maintain the pH of the first solution in a pre-determined range;
  heating the formed first solution up to a pre-determined temperature of 50° C. to 90° C., wherein the heating being done indirectly to avoid solution charring;
  adding a second plurality of substances in the first solution in each of the one or more jacketed reactors to form a second solution, wherein the second plurality of substances comprises the one or more residues containing antimony and potassium hydrogen tartrate, wherein the addition of the second plurality of substances to the first solution is done based on a pre-determined criterion, wherein the addition of potassium hydrogen tartrate is done based upon a leaching efficiency and the content of antimony in the one or more residues containing antimony, wherein the quantity of potassium hydrogen tartrate is higher than a stoichiometric requirement and wherein potassium hydrogen tartrate has a purity of more than 99%;
  injecting a solution of hydrogen peroxide to the second solution in each of the one or more jacketed reactors through corresponding one or more of pumps, wherein the solution of hydrogen peroxide is added after reaction of the second plurality of substances with the heated first solution at the pre-determined temperature of 50° C. to 90° C. for a second pre-determined interval of time, wherein the second pre-determined interval of time after which the solution of hydrogen peroxide is added is 0.5 to 4 hours, wherein the solution of hydrogen peroxide being added for oxidation of the second solution; and obtaining the leached solution in a form of the slurry of the one or more residues bearing antimony after the first pre-determined interval of time at the pre-determined temperature.

2. The method as recited in claim 1, wherein the pre-determined criterion comprises adding the second plurality of substances to the first solution when the first solution is at the pre-defined temperature between 50° C. and 90° C. and wherein the pre-determined range of pH maintained by the addition of the sulfuric acid being 2.0 to 5.5.

3. The method as recited in claim 1, further comprising directly transferring the aqueous solution to the jacketed crystallizer for the crystallization when the concentration of the antimony in the aqueous solution being in a desirable concentration without using evaporator system.

4. The method as recited in claim 1, further comprising washing the formed one or more crystals of the potassium antimony tartrate with water to extract the mother liquor entrapped in each of the one or more crystals of the potassium antimony tartrate, wherein the one or more crystals of the potassium antimony tartrate being dried and ground.

5. The method as recited in claim 1, further comprising performing washing of the solid residue obtained from the filtering of the slurry of the leached solution of the one or more residues bearing antimony along with the mother liquor obtained from the centrifugation by adding the demineralized water or steam condensate water, wherein the washing being done to wash out soluble antimony from the solid residue, wherein the washing being performed for half to three hours and wherein the washing being performed at a temperature of 30° C. to 90° C.

6. The method as recited in claim 5, further comprising filtering the slurry retrieved after the washing of the solid residue based on antimony content in the slurry.

7. The method as recited in claim 1, wherein the first pre-determined interval of time for the leaching of the one or more residues bearing antimony being between two to eight hours.

* * * * *